United States Patent
Yan et al.

(10) Patent No.: US 7,034,647 B2
(45) Date of Patent: Apr. 25, 2006

(54) INTEGRATED MAGNETICS FOR A DC-DC CONVERTER WITH FLEXIBLE OUTPUT INDUCTOR

(75) Inventors: Liang Yan, Malden, MA (US); Dayu Qu, Malden, MA (US); Bradley Lehman, Belmont, MA (US)

(73) Assignee: Northeastern University, Boston, MA (US)

( * ) Notice: Subject to any disclaimer, the term of this patent is extended or adjusted under 35 U.S.C. 154(b) by 172 days.

(21) Appl. No.: 10/492,238

(22) PCT Filed: Oct. 15, 2002

(86) PCT No.: PCT/US02/32703

§ 371 (c)(1),
(2), (4) Date: Apr. 9, 2004

(87) PCT Pub. No.: WO03/032477

PCT Pub. Date: Apr. 17, 2003

(65) Prior Publication Data

US 2004/0189432 A1    Sep. 30, 2004

Related U.S. Application Data

(60) Provisional application No. 60/328,987, filed on Oct. 12, 2001.

(51) Int. Cl.
*H01F 27/24* (2006.01)
*H02M 3/335* (2006.01)

(52) U.S. Cl. .................. 336/212; 336/5; 336/178; 336/180; 363/17

(58) Field of Classification Search ................ 336/170, 336/178, 212, 180–182, 12, 5; 361/17, 132; 363/17, 132
See application file for complete search history.

(56) References Cited

U.S. PATENT DOCUMENTS 3,553,620 A    1/1971    Cielo et al.

(Continued)

OTHER PUBLICATIONS

Miwa et al., "High Efficiency Power Factor Correction Using Interleaving Techniques," IEEE, pp. 557-568, 1992.

(Continued)

*Primary Examiner*—Anh Mai
(74) *Attorney, Agent, or Firm*—Weingarten, Schurgin, Gagnebin & Lebovici LLP

(57) ABSTRACT

An integrated magnetic assembly that allows the primary and secondary windings of a transformer and a separate inductor winding to be integrated on a unitary magnetic structure is disclosed. The unitary magnetic structure includes first, second, and third legs that are physically connected and magnetically coupled. The primary and secondary windings of the transformer can be formed on the third leg of the unitary magnetic structure. Alternatively, the primary and secondary windings can be split between the first and second legs. Thus, the primary winding includes first and second primary windings disposed on the first and second legs and the secondary winding includes first and second secondary windings disposed on the first and second legs. The inductor winding may also be formed either on the third leg or it may split into first and second inductor windings and disposed on the first and second legs. In addition, one or more legs may include an energy storage component such as an air gap. This integration of the primary and secondary windings and the inductor winding on the unitary magnetic structure advantageously decouples the inductor function from the transformer function and allows the more optimal design of both the inductor and the transformer. The unitary magnetic structure may be coupled to a full bridge, a half bridge, or a push pull voltage input source to form a DC—DC converter.

37 Claims, 16 Drawing Sheets

U.S. PATENT DOCUMENTS

| | | | | |
|---|---|---|---|---|
| 3,694,726 | A | * | 9/1972 | Cielo et al. .................... 363/25 |
| 3,965,408 | A | | 6/1976 | Higuchi et al. ................ 321/25 |
| 3,990,030 | A | | 11/1976 | Chamberlin .................. 336/65 |
| 4,774,649 | A | | 9/1988 | Archer ......................... 363/20 |
| 4,853,668 | A | | 8/1989 | Bloom ....................... 336/214 |
| 4,864,478 | A | | 9/1989 | Bloom ......................... 363/16 |
| 4,902,942 | A | * | 2/1990 | El-Hamamsy .............. 315/276 |
| 5,208,739 | A | * | 5/1993 | Sturgeon ...................... 363/24 |
| 5,335,163 | A | | 8/1994 | Seiersen ...................... 363/126 |
| 5,436,818 | A | | 7/1995 | Barthold ....................... 363/21 |
| 5,555,494 | A | | 9/1996 | Morris ......................... 363/17 |
| 5,684,678 | A | * | 11/1997 | Barrett ......................... 363/17 |
| 5,784,266 | A | | 7/1998 | Chen ........................... 363/16 |
| 6,239,584 | B1 | | 5/2001 | Jang et al. ................... 323/222 |
| 6,362,986 | B1 | | 3/2002 | Schultz et al. .............. 363/132 |
| 6,388,896 | B1 | | 5/2002 | Cuk ............................ 363/16 |
| 6,549,436 | B1 | | 4/2003 | Sun ............................. 363/44 |

OTHER PUBLICATIONS

Wolfs, "A Current-Sourced Dc-DC Comverter Derived via the Duality Principle from the Half-Bridge Converter," IEEE Transactions on Industrial Electronics, vol. 40., No. 1, pp. 139-144, Feb. 1993.

Zhu et al., "New Start-up Schemes for Isolated Full-Bridge Boost Converters," IEEE Transactions on Power Electronics, vol. 18, No. 4, pp. 946-951, Jul. 2003.

Severns et al., "Modern DC-to-DC Switch Mode Power Converter Circuits" Copyright 1985; Library of Congress Card No. 84-12026; ISBN 0-442-21396-4.

* cited by examiner

INTEGRATED MAGNETICS FOR A DC-DC CONVERTER WITH FLEXIBLE OUTPUT INDUCTOR

CROSS REFERENCE TO RELATED APPLICATIONS

The present application claims priority under 35 USC §119(e) of U.S. Provisional Application No. 60/328,987 titled Integrated Magnetic Full Wave Converter with Flexible Output Inductor, filed Oct. 12, 2001.

STATEMENT REGARDING FEDERALLY SPONSORED RESEARCH OR DEVELOPMENT

N/A

BACKGROUND OF THE INVENTION

DC—DC converters are used to convert an input DC voltage into a different output DC voltage having a larger or smaller magnitude, possibly with the opposite polarity or with isolation of the input and the output ground references. Contemporary DC—DC converters should provide a high power density and a high efficiency at a minimum price and high efficiency. The magnetic components of a typical DC—DC converter are often expensive, usually the physically largest, and often very significantly affect the efficiency and reliability of the converter.

DC—DC converters accept input energy from a voltage source at an input voltage and current and provide converted output energy at an output voltage and current, usually to a capacitively filtered output that functions as a voltage sink. When isolation is used, the input voltage is switched on and off at a high frequency and provided to a transformer. The transformer provides both input/output isolation and any required voltage level conversion. However, because the input voltage is typically switched at a high frequency the output voltage and current from the transformer cannot be directly provided to a load in a regulated manner. An inductor is typically required in the energy conversion to act as a current filter. Thus in a typical Buck mode forward converter, two magnetic components are required, an averaging inductor and a transformer.

Recent advances in the DC—DC converter art have included integrating the transformer and inductor functions onto a common magnetic structure or assembly. This is known in the art as integrated magnetics. Advantageously, integrated magnetics reduces the number of components in the DC—DC converter and simplifies the construction of the DC—DC converters thereby lowering the cost and size of the converter and potentially increasing the reliability of the converter.

However, often the integrated magnetics of the prior art do not have an inductor winding because the windings of the transformer, particularly the secondary winding of the transformer, provides the necessary inductance during the magnetic energy discharge operating stage. Thus, the secondary windings of the transformer must satisfy the input/output isolation requirements, the voltage level conversion requirements, and the filter requirements.

The design of a transformer used in a DC—DC application includes a variety of trade-off analyses. These can include the trade-off between copper loss, ferrite loss, and total size. The design of an inductor used in a DC—DC converter includes balancing the number of turns in the inductor and the gap length affects both the inductance and the overall size of the inductor. In general, there is a minimum inductance necessary to provide the required output regulated output current. Often times the minimum required inductance requires a number of turns or a gap length that is incompatible with the size and electrical requirements of the transformer that is to be used. As such, neither the inductor nor the transformer is optimally designed and the performance of the DC—DC converter suffers.

In designing the transformer where the secondary winding also functions as the inductor winding, the number of turns of the secondary winding that are needed to provide the necessary inductance affects the number of turns of the primary winding, the core size, and the output current characteristics. This coupling of the design output inductor and the transformer prevents either from being designed to operate in an optimal manner.

Although some of the prior art integrated magnetics did include a separate inductor along with the primary and secondary windings, in these prior art configurations each winding has an independent output. Thus in these prior art systems, there would be four outputs from the integrated magnetics, two from the secondary winding and two from the inductor. The addition of another output requires additional components to provide a full-wave converter configuration. In addition, in these prior art configurations output current typically continuously flowed through the inductor increasing power losses and decreasing efficiency.

It would therefore be desirable to have a DC—DC converter using integrated magnetics in which the transformer and the inductor functions are decoupled. Additionally, these prior art configurations could only be used for push-pull systems and were not suitable or compatible with full wave voltage inverters.

BRIEF SUMMARY OF THE INVENTION

An integrated magnetic assembly that allows the primary and secondary windings of a transformer and a separate inductor winding to be integrated on a unitary magnetic structure is disclosed.

The unitary magnetic structure includes a core having first, second, and third legs that are physically connected and magnetically coupled to one another. The primary and secondary windings of the transformer can be formed on the third leg of the unitary magnetic structure, or alternatively, the primary and secondary windings can be split between the first and second legs. In this embodiment, the primary winding is comprised of first and second primary windings disposed on the first and second legs and the secondary winding is comprised of first and second secondary windings disposed on the first and second legs. The inductor winding may also be disposed either as a single set of windings on the third leg or the inductor winding be may split into first and second inductor windings and disposed on the first and second legs respectively. However, if the inductor winding or windings and the either primary or secondary winding or windings are on the same leg, the inductor windings must be configured so as to avoid being magnetically linked in a transformer coupling relationship to the respective primary or the secondary windings. In general there will be two outputs from the secondary winding and a single inductor output. In addition, one or more legs may include an energy storage component such as an air gap.

This integration of the primary and secondary windings and the inductor winding on the unitary magnetic structure advantageously decouples the inductor function from the transformer function and allows the more optimal design of both the inductor and the transformer. The unitary magnetic structure may be coupled to a full wave voltage inverter such as a half wave voltage inverter, or a push pull voltage inverter to form a DC—DC converter.

BRIEF DESCRIPTION OF THE DRAWINGS

The present invention will be more fully understood by reference to the following Detailed Description of the Invention in conjunction with the Drawings of which.

DETAILED DESCRIPTION OF THE INVENTION

The U.S. Provisional Application No. 60/328,987 titled Integrated Magnetic Full Wave Converter with Flexible Output Inductor, filed Oct. 12, 2001 is hereby incorporated by reference.

An integrated magnetic assembly for use as a transformer that allows the primary and secondary transformer windings, and an inductor winding to be integrated on a unitary magnetic structure is disclosed. The integrated magnetic structure described herein includes a unitary magnetic structure having three legs and a primary and secondary winding disposed on one or more of the three legs. A separate inductor winding on one or more of the three legs of the unitary magnetic structure is also provided for. This configuration advantageously decouples the inductor function from the secondary winding of the transformer and allows both the inductor and the transformer to be more optimally designed. With the addition of a pair of rectifiers, the integrated magnetic assembly may be configured with a full wave voltage inverter and when coupled to a full bridge, half bridge, or push-pull voltage input source is suitable for use in a DC—DC converter.

Figure 1A:
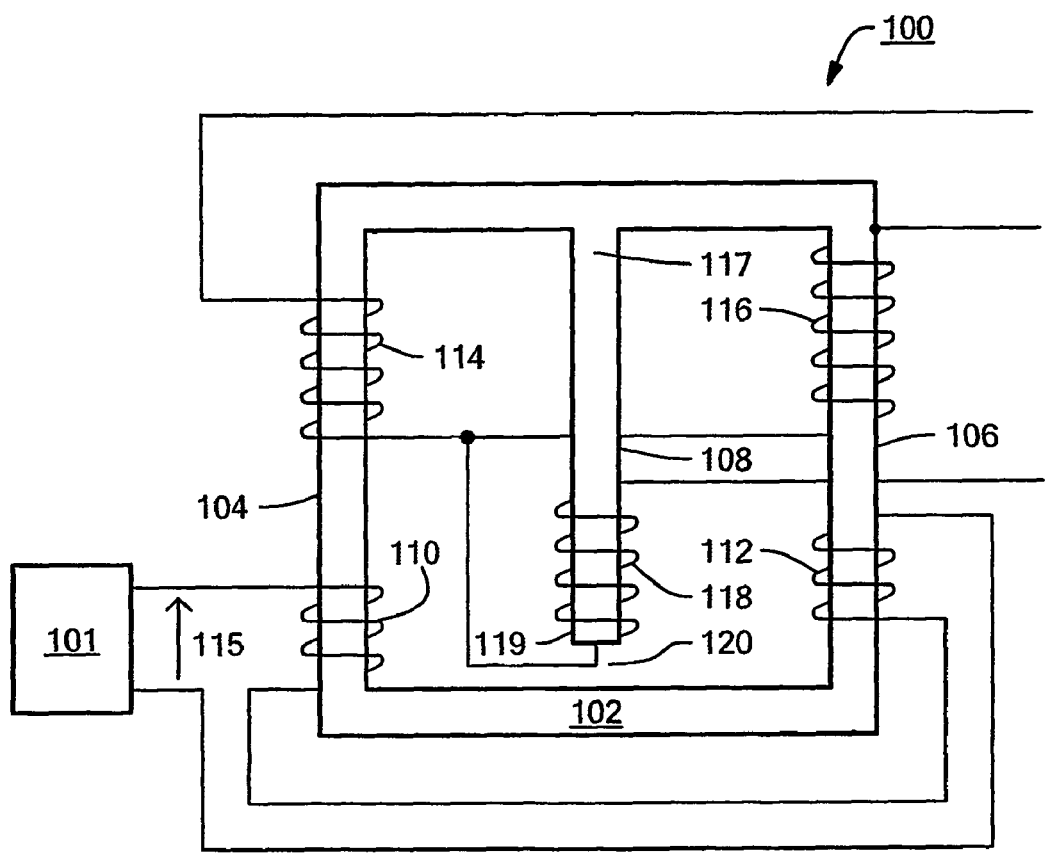
FIG. 1a is a schematic view of an integrated magnetic structure in accordance with the present invention.

FIG. 1a depicts an embodiment of the integrated magnetic assembly. In particular, the embodiment depicted in FIG. 1a includes an integrated magnetic assembly 100 that includes a unitary magnetic assembly 102 that includes a first leg 104 and a second leg 106 that are physically joined and magnetically coupled together. A third leg 108 is physically connected and magnetically coupled to the unitary magnetic structure 102 at a first end 117 and is coupled to the unitary magnetic structure 102 at a second end 119 via an air gap 120. The unitary magnetic structure 102 can be constructed of various materials and should be sized according to the particular application being contemplated. The determination of the size and the material used to construct the unitary magnetic structure 102 are a function of the physical and electrical requirements of a particular application and can be determined according to known techniques.

In the embodiment depicted in FIG. 1a, a first primary winding 110 is disposed on a first portion of the first leg 104. A second primary winding 112 is disposed on a first portion of the second leg 106 and is wound in an opposite direction from the first primary winding 110 in order to produce a magnetic flux oriented in the opposite polarity to the magnetic flux produced by the first primary winding 110. The second primary winding 112 is electrically connected in series with the first primary 110 and a voltage input 115 from an input voltage source (not shown) is provided across the first and second primary windings 110 and 112.

A first secondary winding 114 is disposed on a second portion of the first leg 104 and is magnetically coupled to the first primary winding 110 via the first leg 104 of the unitary magnetic assembly 102. A second secondary winding 116 is disposed on a second portion of the second leg 106 and is magnetically coupled to the second primary winding 112 via the second leg 106 of the unitary magnetic assembly 102. As discussed above, the first and second primary windings produce respective magnetic fluxes that have opposite polarities due to the opposite winding directions. As such, secondary windings 114 and 116 will produce output voltages having opposite polarities.

Figure 1B:
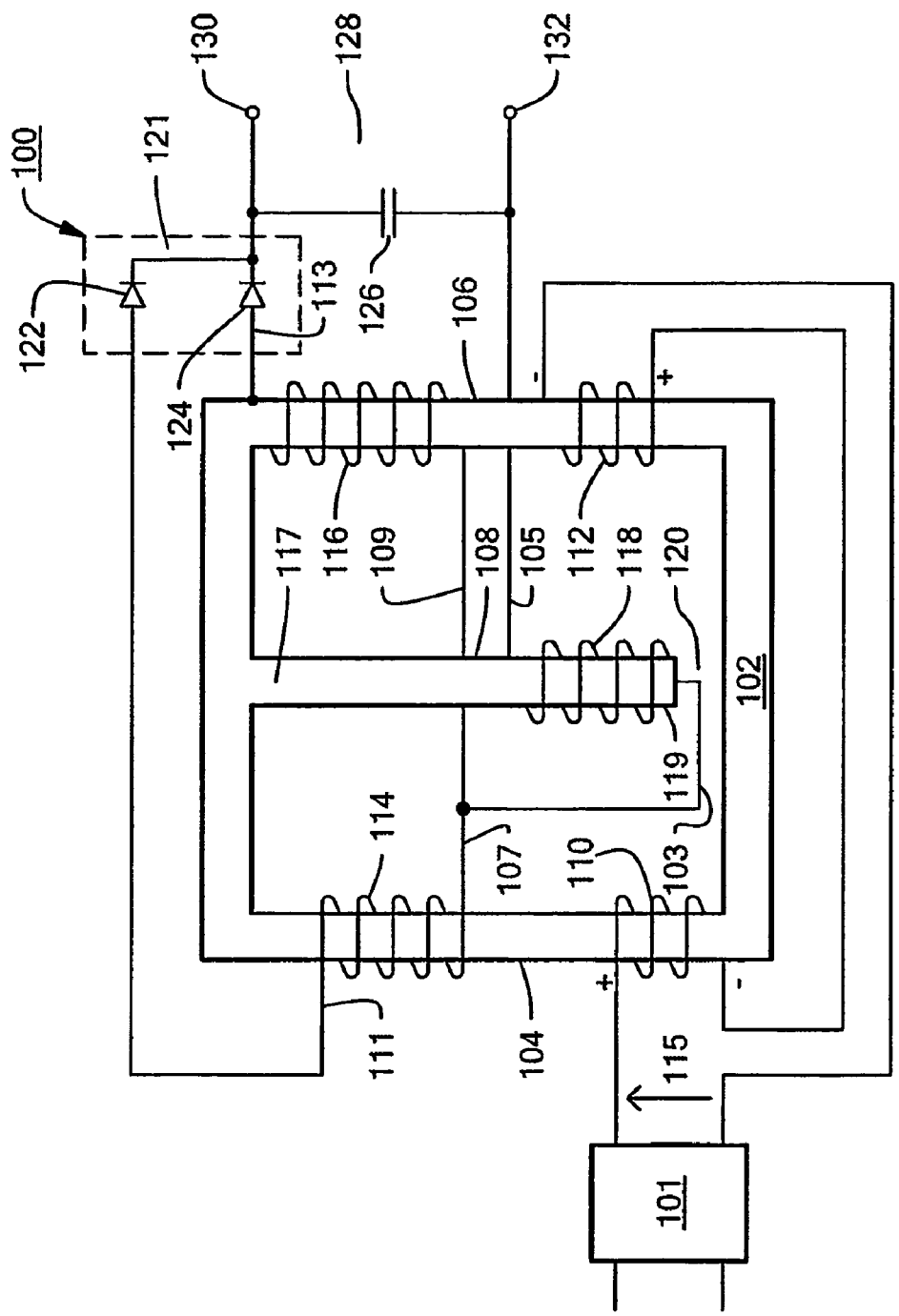
FIG. 1b is a schematic view of an integrated magnetic assembly used in a full wave converter in accordance with the present invention.

As further depicted in FIG. 1b, a first end 111 of the first secondary winding 114 provides a first transformer output and a first end 113 of the second winding 116 provides a second transformer output.

A second end 107 of the first secondary winding 114 is electrically connected to a second end 109 of the second secondary winding 116. The inductor winding 118 includes a first end 103 that is electrically connected to the electrical connection between second ends 107 and 109. The inductor winding 118 includes a second end 105 that provides an inductor output.

Although the primary and secondary windings are depicted and described as being disposed on separate portions of the first and second legs 104 and 106, it should be appreciated that in this embodiment and the embodiments that follow, this configuration is for illustrative purposes only. Although the primary and secondary windings can be configured as depicted in the figures, in general, the primary and secondary windings will be close together, or even overlapping one another, to ensure that the maximum magnetic coupling occurs between them.

The air gap 120 is provided in the illustrative embodiments as a preferred embodiment for manufacturing purposes. The purpose of the air gap is to store energy that is charged and discharged during operation of the integrated magnetic assembly. Although the unitary magnetic structure stores a quantity of energy, the lower permeance of the air gap allows the air gap to store a quantity of energy that would otherwise saturate the higher permeance unitary magnetic structure material. Thus, the air gap is typically able to store a greater amount of energy than the unitary magnetic structure core material. The length of the air gap 120 can be adjusted for a given cross sectional area to provide for a predetermined amount of energy storage.

Since a function of the air gap 120 is to store energy, the air gap can be replaced by other magnetic energy storage components. In one alternative embodiment, if the desired amount of energy to be stored in the magnetic material that is used in the unitary magnetic structure is sufficient for the desired application, the air gap 120 can be eliminated. In this embodiment, magnetic energy is stored non-uniformly within the unitary magnetic core structure during operation and most of the energy is stored in the third leg 108.

In another embodiment in which the air gap 120 is eliminated as described in the above embodiment. However, the amount of energy that is needed for the proper operation is more than can be stored in the uniformly sized unitary magnetic structure. In this embodiment, the cross sectional area of the each of the first, second, and third legs 104, 106, and 108 can be sized and configured individually to lower the permeance of one or more legs of the unitary magnetic structure to allow for the required energy to be stored. Typically, the third leg 108 is modified to store the energy.

In another embodiment in which the air gap 120 is eliminated and the third leg 108 is physically and magnetically coupled to the unitary magnetic structure 102, and the amount of energy that is needed for the proper operation is more than can be stored in the uniformly sized unitary magnetic structure, a portion of one or more of the first, second, or third legs 104, 106, and 108 can be constructed of a material having a lower permeance relative to the rest of the unitary magnetic structure 102, thus allowing for greater energy storage within the portion of the leg constructed with the new material. In addition, the cross sectional area and length of the portion of the leg constructed of the new material can be varied to adjust the permeance of the portion as needed to store the required amount of energy.

It should be recognized that in some situations it is not desirable for the unitary magnetic structure 102 to saturate during the energy storage process. In this case, the design of the unitary magnetic structure 102 including the materials used to construct it and the size and configuration of the unitary magnetic structure can be determined as a function of the desired current, the flux density and average flux density in the respective legs, the current ripple requirement, the switching frequency, and the geometry, size, and configuration of the unitary magnetic structure 102. These parameters are not meant to be inclusive and are only a subset of the parameters that may be needed. Accordingly in the embodiment in which it is desirable that the unitary magnetic structure 102 not saturate, each leg of the unitary magnetic structure 102 can be individually constructed from a unique material and arbitrarily sized and configured individually, as discussed above.

In other situations, the saturation of the unitary magnetic structure may be either desirable or tolerable. In these conditions, there is energy loss in the material or materials that comprises the unitary magnetic structure. Accordingly, the materials and the size and configuration of the unitary magnetic structure 102 can be determined as a function of the power output requirements, the switching frequency, and the power efficiency that is required. Accordingly in the embodiment in which it is desirable or tolerable that the unitary magnetic structure 102 saturate, each leg of the unitary magnetic structure 102 can be individually constructed from a unique material and arbitrarily sized and configured individually, as discussed above.

Accordingly, in the embodiments that follow, the air gap 120 is shown as a preferred embodiment only, but the invention should not be so limited. Accordingly, other energy storage means as described above may be used in place of the air gap 120, or no additional storage means may be used.

In the embodiment depicted in FIG. 1a, the primary windings of the transformer and the secondary windings of the transformer are split and disposed on the first and second legs 104 and 106, and a single inductor winding is disposed on leg 108. It is possible to combine any windings that are split between the first and second legs, 104 and 106, onto the third leg 108 as a single winding. Similarly, any winding that is formed on the third leg 108, may be split between the first and second legs 104 and 106 and electrically connected in series with one another and have the same polarity. However, to avoid creating transformer coupling between the primary and/or secondary winding or windings and the inductor winding or windings that are disposed on the same leg of the unitary magnetic structure, the inductor windings must be configured so as to avoid significant magnetic coupling to the primary windings. Typically the split inductor windings are not connected in series and have are configured in opposite polarities to reduce the magnetic coupling between the inductor windings and the primary windings. Rules on how to split windings on magnetic cores are detailed in: "Better Understanding and Synthesis of Integrated Magnetics with Simplified Gyrator Model Method", by L. Yan and B Lehman and published in the IEEE PESC, 2001 on pages 433–438.

Accordingly, in the embodiments described below, for any given embodiment, the primary and secondary windings can be split into first and second primary windings and first and second secondary windings and disposed on the first and second legs respectively. Alternatively, the primary and secondary windings can be combined into a single primary and secondary winding and disposed on the third leg 108. Similarly, the inductor winding can be a single winding on the third leg 108, or split into first and second inductor windings that are disposed on the first and second legs respectively.

Figure 1C:
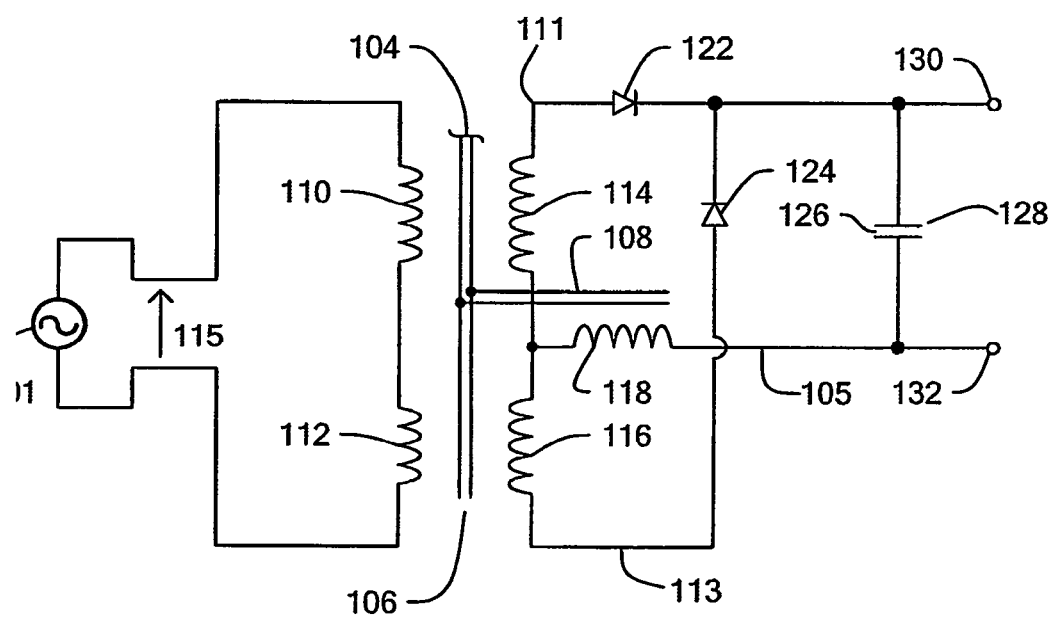
FIG. 1c is a schematic circuit diagram of a circuit that is equivalent to the integrated magnetic assembly depicted in FIG. 1b.

FIG. 1b depicts the integrated magnetic assembly 100 of FIG. 1a configured as a full-wave converter. FIG. 1c depicts an equivalent electrical circuit of the full wave converter depicted in FIG. 1b. In particular as shown in FIG. 1b, a voltage source 101 is electrically connected across the first and second primary windings 110 and 112 providing an input voltage 115. In addition, the first end 111 of the first secondary winding 114 is electrically connected to an electronic circuit 121. In the illustrated embodiment, the electronic circuit 121 includes first and second rectifiers 122 and 124. In particular, the first end 111 of the first secondary winding 114 is electrically connected to the first rectifier 122, and the first end 113 of the second secondary winding 116 is electrically connected to a second rectifier 124. The outputs of the first and second rectifiers are electrically connected together to form a first output 130. The inductor winding output 105 forms a second converter output 132, and typically a capacitor 126 is electrically connected between the first and second outputs 130 and 132 forming a filtered converter output 128. The capacitor 126 acts a filter capacitor and may be optional depending on the system requirements, or depending on the application, it may be replaced by other electronic components. Typically, the first and second rectifiers 122 and 124 are semiconductor diodes, or MOSFET transistors used as synchronous rectifiers. The electronic circuit 121 may also contain other components and circuits containing components such as resistors, inductors, capacitors, semiconductor devices, filters, switches, and loads. The choice of a particular circuit or components is a function of the application requirements that the voltage converter is to meet. This list of possible electronic devices is not meant to be limiting in any manner. In addition, if required by the application requirements that the voltage converter is to meet, electronic components and circuits may be coupled to the first and second output terminals depending on the output requirements.

Figure 2:
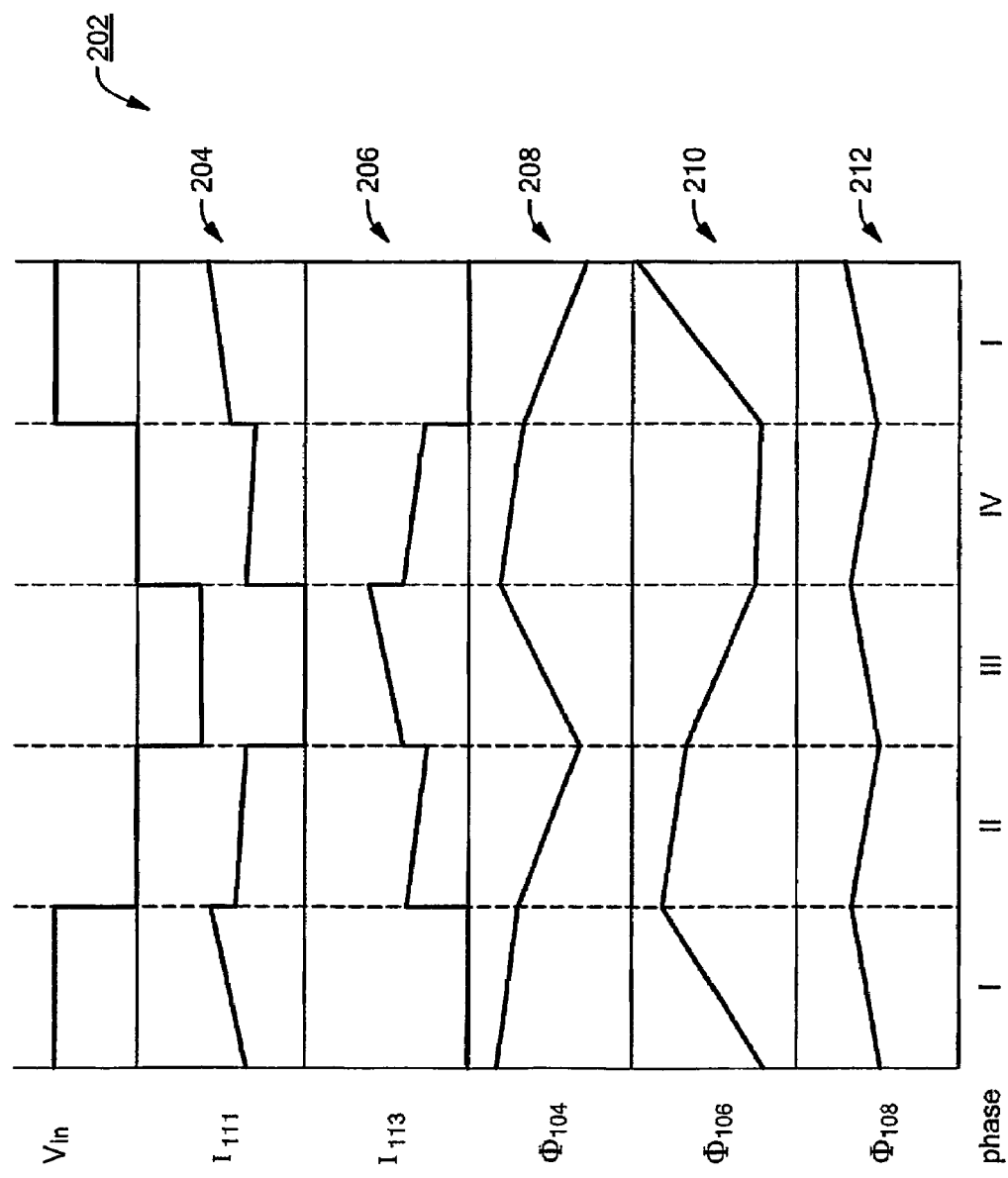
FIG. 2 is a plot of various waveforms of voltage, current, and magnetic flux within the integrated magnetic assembly depicted in FIGS. 1a and 1b.
Figure 3A:
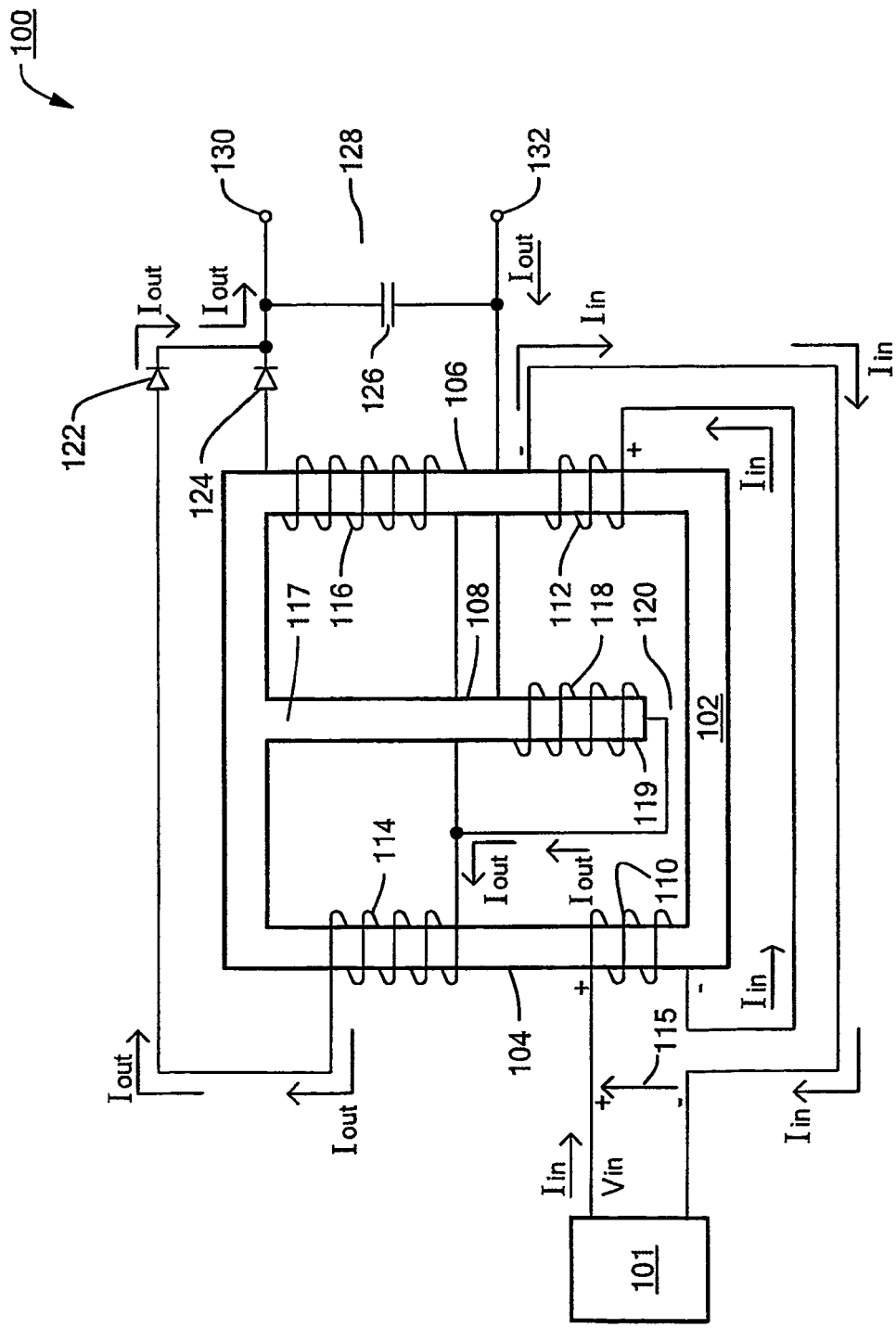
FIG. 3a depicts a first current path in the integrated magnetic assembly of FIGS. 1a and 1b.
Figure 3B:
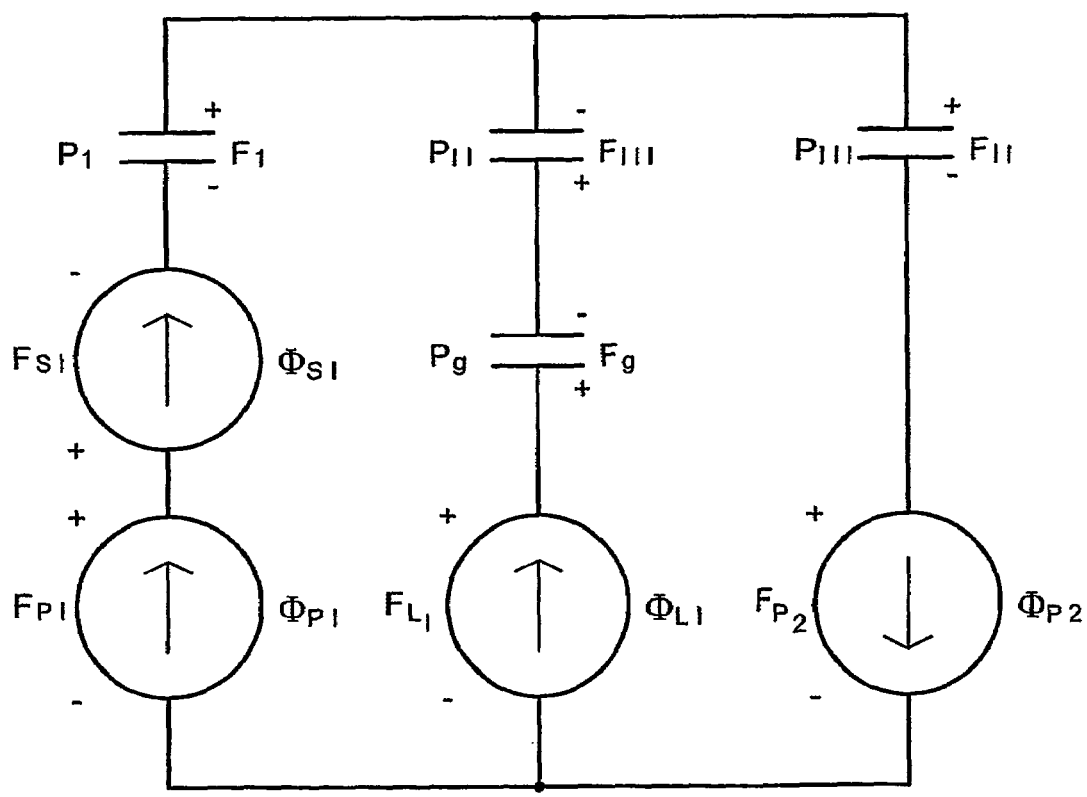
FIG. 3b depicts the magnetic state of the integrated magnetic assembly during one phase of operation.
Figure 4A:
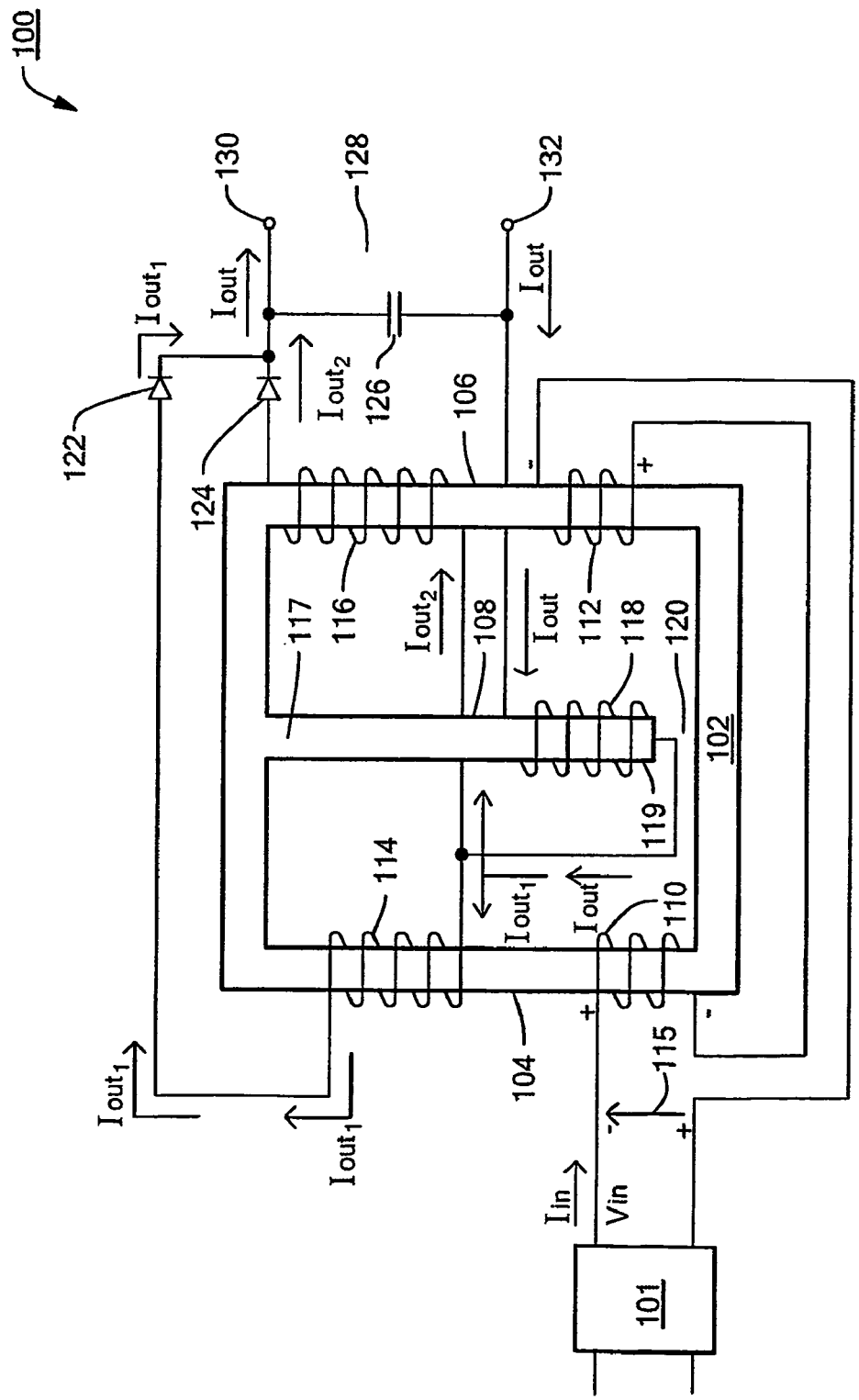
FIG. 4a depicts a second current path in the integrated magnetic assembly of FIGS. 1a and 1b.
Figure 4B:
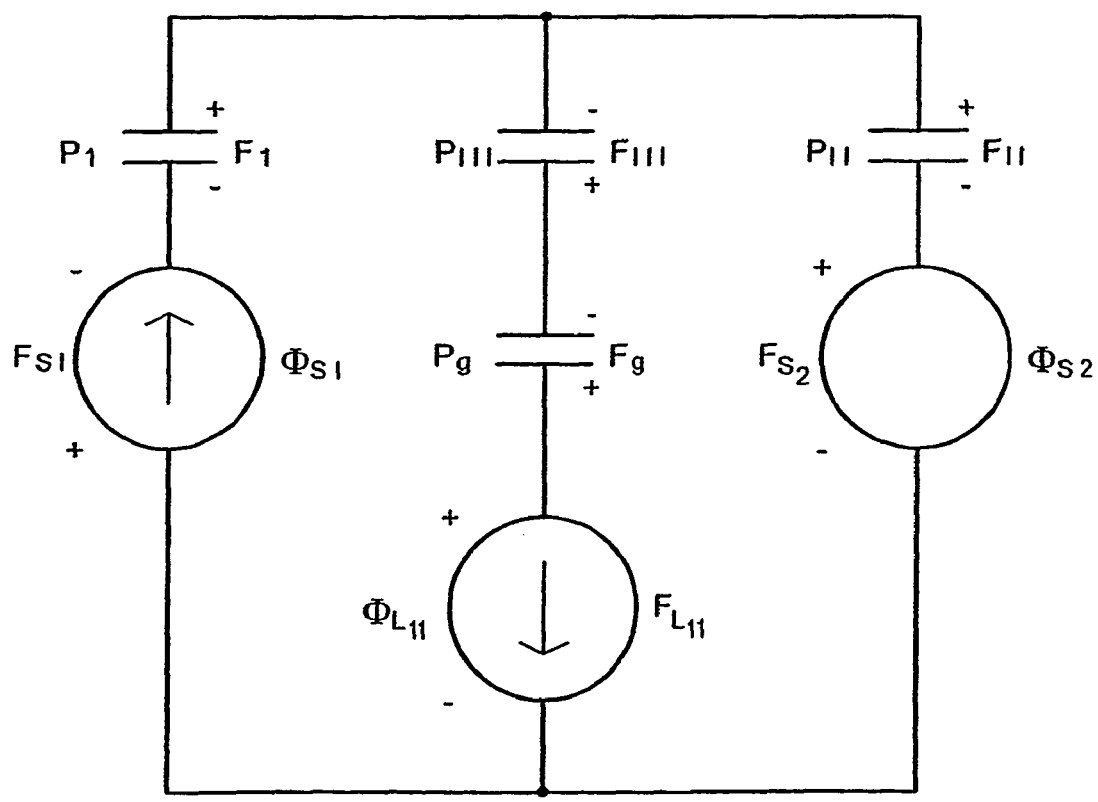
FIG. 4b depicts the magnetic state of the integrated magnetic assembly during another phase of operation.
Figure 5:
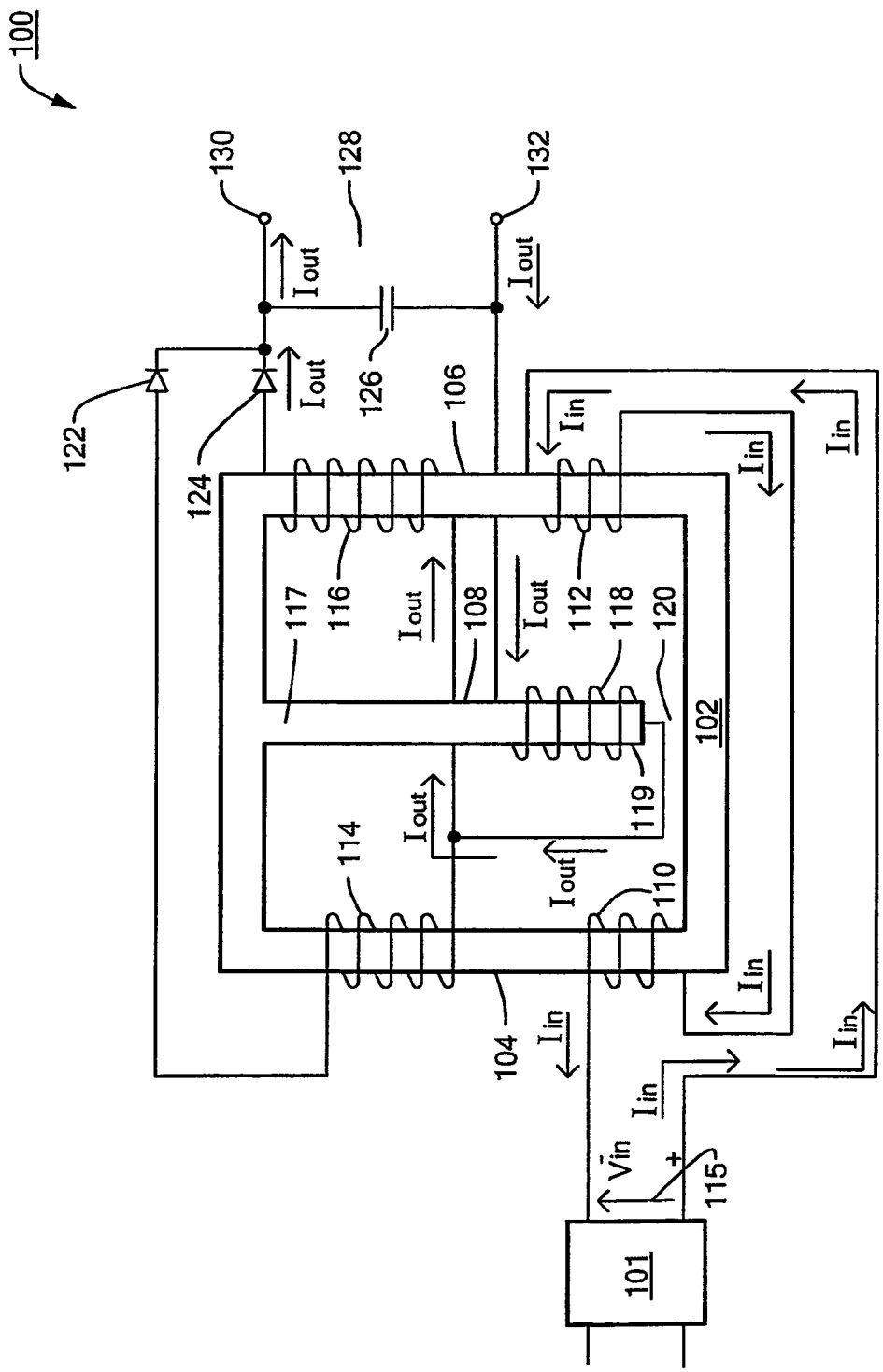
FIG. 5 depicts a third current path in the integrated magnetic assembly of FIGS. 1a and 1b.

In the description that follows, the converter depicted in FIGS. 1b and 1c receives an input voltage that has four basic operating phases corresponding to four different phases of the input voltage signal. The input voltage signal depicted as waveform 202 in FIG. 2 includes four phases: a positive voltage pulse as phase I, a first dead time as phase II, a negative voltage pulse as phase III, and a second dead time as phase IV. FIG. 2 not only depicts the input voltage but also depicts various current and flux waveforms within the unitary magnetic assembly as well. The current path in each of the four operating phases I–IV are depicted in FIGS. 3a, 4a, and 5 respectively. The magnetic states in the first, second, and third legs of the unitary magnetic assembly for each operating phase I–IV are modeled using a capacitive modeling method and are depicted in FIGS. 3b and 4b respectively.

In a capacitive model the active winding is represented as a current source or sink, the derivative of the flux, $\Phi$, i.e., the flux rate, is determined for each leg, the permeance of each leg and for the air gap is represented as a capacitor with a value equal to the permeance, $P_i$ where i=1, 2, 3, and gap, and F is the magnetomotive force on the permeance. For a winding on a core leg there are two basic relations that provide the connection between the magnetic circuit and the electrical circuit:

$$\Phi = \frac{V}{N} \quad (1)$$

$$F = NI$$

In addition, the permeance of the gap is given by:

$$P_g = \frac{\mu_0 A}{l_g}. \quad (2)$$

Where V is the voltage on the winding; N is the number of winding turns; I is the current in the winding; $\mu_0$ is the permeability of air; A is the cross sectional area of the gap; and $l^g$ is the gap length. In the analysis that follows, the magnetomotive force on the legs of the unitary magnetic assembly are neglected since the permeances of the legs of the unitary magnetic assembly are assumed to be infinite when compared to the permeance of the air gap. Leakage energy is not considered, and all devices are considered ideal.

During phase I the input voltage is greater than zero and magnetic flux is produced in the first and second legs by the first and second primary windings respectively. The magnetic fluxes that are produced by the first and second primary windings are oriented in opposite directions and accordingly, the first secondary winding 114 forms a positive voltage and the second secondary winding 116 forms a negative voltage. This forces the first rectifier 122 to conduct and the second rectifier 124 to switch off. Accordingly, as depicted in FIG. 3a, this will provide an output current path from output terminal 132 through the inductor winding 118, and the first secondary winding 112 and via the first rectifier 122, to the first output terminal 130.

In phase I, the derivatives of the flux produced by the first and second windings are given by:

$$\Phi_{p1} = \frac{V_{Np1}}{N_{p1}} \quad (3)$$

$$\Phi_{p2} = \frac{V_{in} - V_{Np1}}{N_{p2}}$$

Where $N_{p1}$ and $N_{p2}$ are the number of turns of the first and second primary windings 110 and 112, $V_{in}$ is the magnitude of the input voltage pulse 115, and $V_{Np1}$ and $V_{Np2}$ are the voltages across the respective first and second primary windings 110 and 112. As can be seen from FIG. 3b, the flux accumulation in the third leg 108 and the energy storage in the air gap associated therewith, is a function of the difference between the flux derivatives in the first and second primary windings. FIG. 3b depicts the flux state and transitions in each of the three legs of the unitary magnetic assembly where $\Phi$=FP and the flux $\Phi$ has the same polarity as the corresponding F. If $N_{p1}=N_{p2}=N_p/2$ and $N_{s1}=N_{s2}$ then flux rate in the third leg 108 can be given as:

$$\Phi_{L\_I} = \frac{\left(\frac{N_s}{N_p}\right)V_{in} - V_{out}}{N_L + \frac{N_s}{2}} \quad (4)$$

where $N_p$ is the total primary winding and is the sum of the winding turns on the first and second primary windings 110 and 112; $N_s$ is the secondary winding turn on the first and second secondary windings 114 and 116; $N_L$ is the inductor winding turn on the inductor winding 118; $V_{in}$ is the input voltage; and $V_{out}$ is the desired output voltage. As can be seen in FIG. 2, the flux in the first leg 104, decreases during phase I, while the flux produced by the oppositely oriented primary winding in the second leg 106 increases. The flux rate in the third leg 108 is equal to the difference between the flux rate in the first and second legs. The flux in the third winding 108 is depicted in FIG. 2 as waveform 212. Thus, the flux in the third leg 108 increases during phase I and energy storage in the air gap is increasing.

During the first dead time period, phase II, the input voltage is zero and the primary windings are free of any input. The energy within the air gap 120 will release and the first and second secondary windings and the inductor winding form the output circuit. This is illustrated in FIG. 4a in which the output current path is from node 132, through the inductor winding 118 and then split between the first and second secondary windings 114 and 116 respectively, through the respective first or second rectifier and to output terminal 130. The flux rate in the center leg is given by:

$$\dot{\Phi} = \frac{V_{out}}{N_L + \frac{N_s}{2}}. \quad (5)$$

Assuming that the unitary magnetic structure is symmetric and that the first and second secondary windings have the same number of turns, the output current will be split evenly between the two windings, as is depicted in FIG. 4b. This results in a symmetric magnetic state about the third leg 108, and the flux in the center leg decreases as energy is provided to the circuit. As depicted in FIG. 2, in phase II, both the first and second legs have a decrease in magnetic flux as depicted in waveforms 208 and 210 respectively. The flux in the air gap 120 in the third leg also decreases as depicted in waveform 212.

In phase III, the input voltage is again applied to the first and second primary windings 110 and 112, but in this phase, the input voltage is less than zero. The voltages in the first and second secondary windings are opposite from phase I, and the second rectifier 124 is turned on and the first rectifier 122 is turned off. The flux rate directions in the first leg 104 and the second leg 106 are reversed, and the current path, which is depicted in FIG. 5, is from the output terminal 132 to the inductor winding 118, to the secondary winding 116, to the second rectifier 124 and to output terminal 130. In this phase as depicted in waveforms 208, 210, and 212 the flux in the first leg 104 increases, the flux in the second leg 106 decreases, and the flux in the third leg increases, thus storing energy in the air gap 120 again.

Phase IV, the second dead time in the input voltage waveform, again will see the flux in the first, second, and third legs decreasing as energy is released to the circuit providing current.

To derive the input-output voltage transfer function, assume a duty ratio, D, that is less than one-half. Since the flux change on the air gap 120 for each half-cycle is balanced, the flux relationship is given by:

$$\dot{\Phi}_{L\_I}D = \dot{\Phi}_{L\_II}(0.5-D). \quad (6)$$

From equations (2), (3), (4) and (5) the ideal voltage transfer function is given by:

$$\frac{V_{out}}{V_{in}} = 2D \frac{N_s}{N_p} \quad (7)$$

which is the same as the voltage transfer function of a typical full wave Buck mode forward converter circuit. It is important to note that the voltage transfer function given in equation (7) does not include as a parameter the number of turns of the inductor winding $N_1$. As discussed above, the decoupling of the voltage transfer function from the inductor winding allows for the independent design of the transformer and the inductor. The voltage-input waveform 202 is balanced in terms of volt-second product. Although symmetric operation is shown in that the amplitude and pulse widths of the positive and negative voltages are equal, asymmetric operation is also known. In asymmetric operation, the volt-second product is equal, but the amplitude and the pulse width of the positive and negative pulses are not equal to one another. For example, the positive pulse may have an amplitude twice the negative pulse, but a pulse width only one-half the pulse width of the negative pulse.

Figure 6:
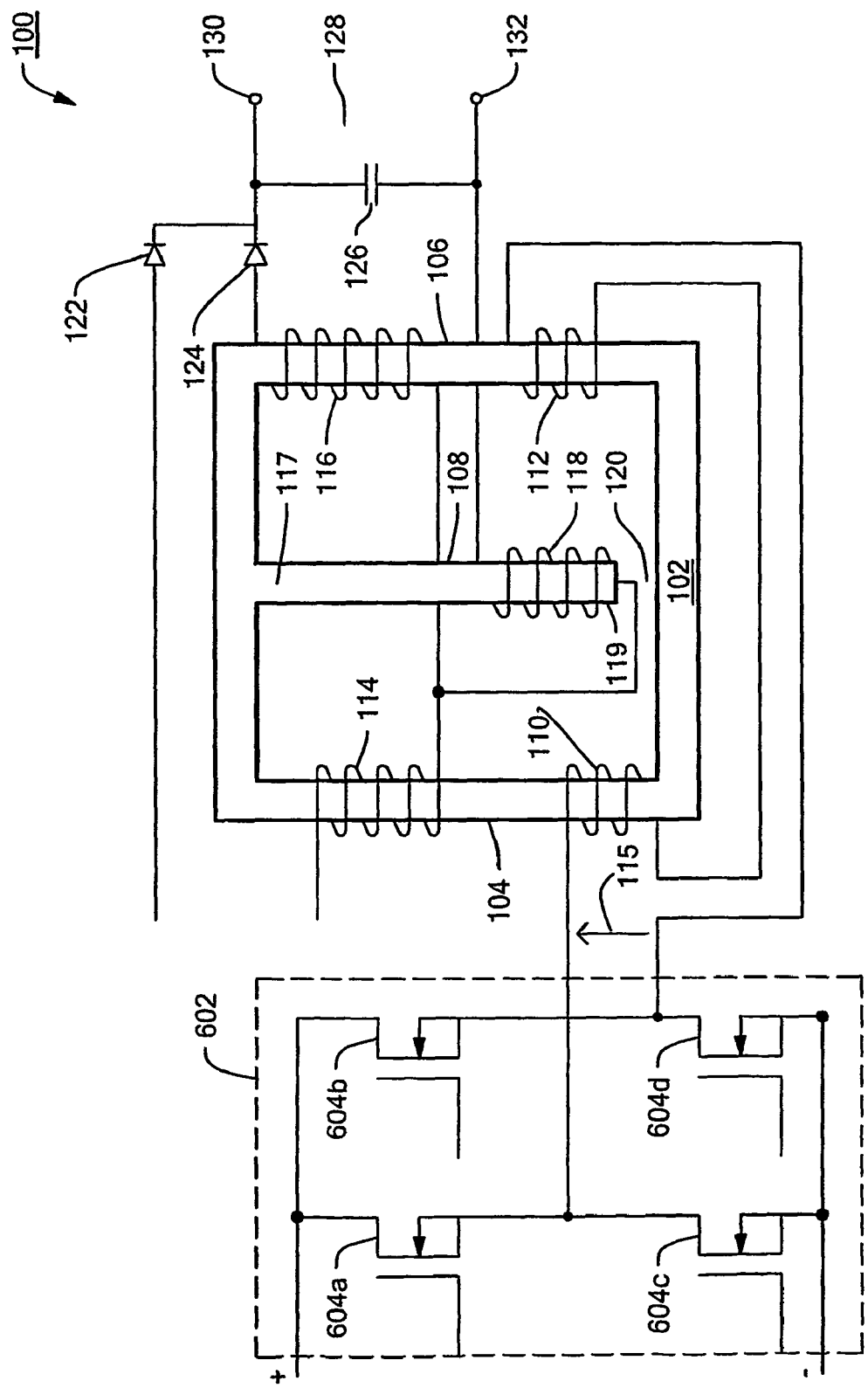
FIG. 6 depicts the integrated magnetic assembly used in conjunction with a full bridge voltage inverter.
Figure 7:
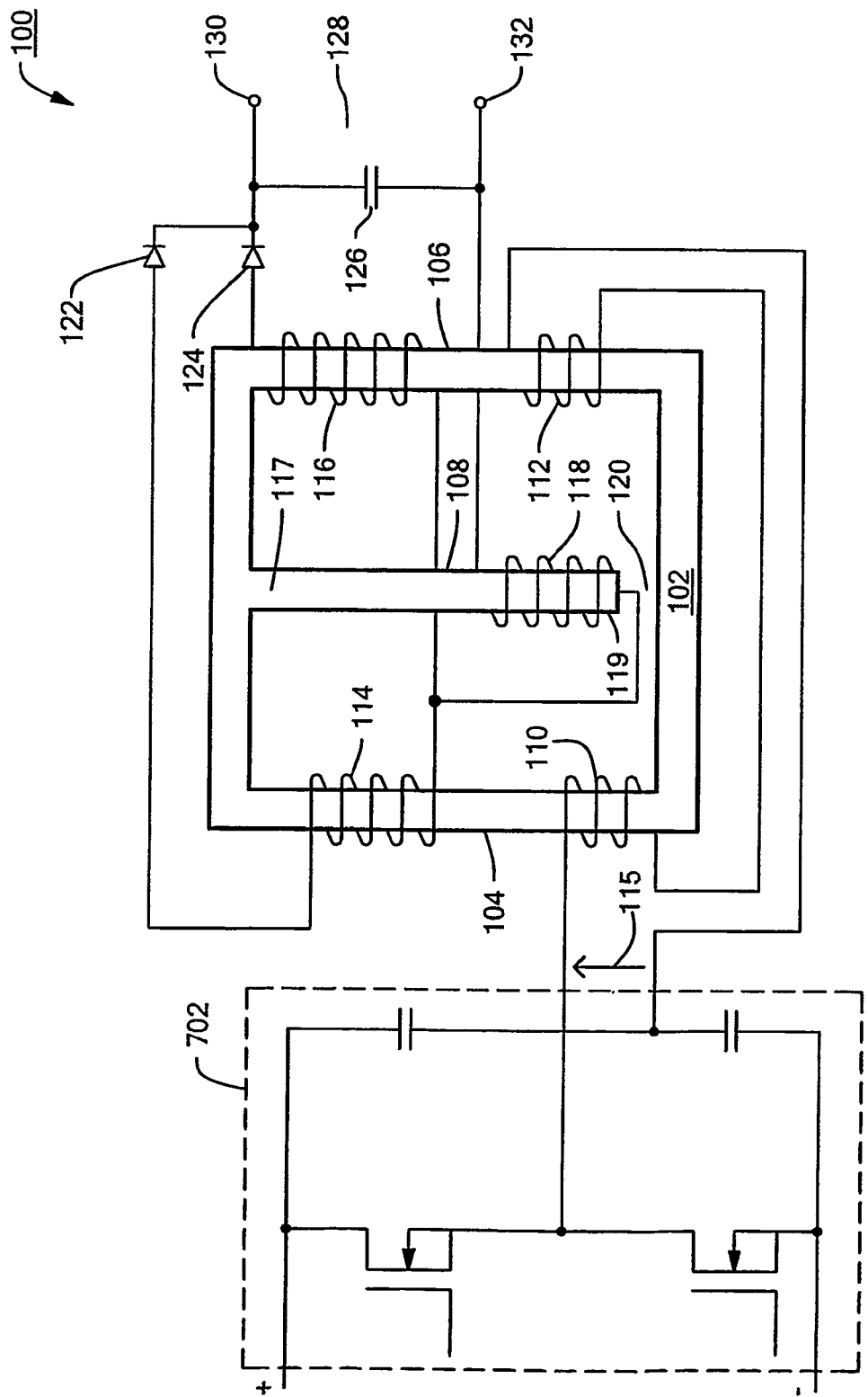
FIG. 7 depicts the integrated magnetic assembly used in conjunction with a first half bridge voltage inverter.
Figure 8:
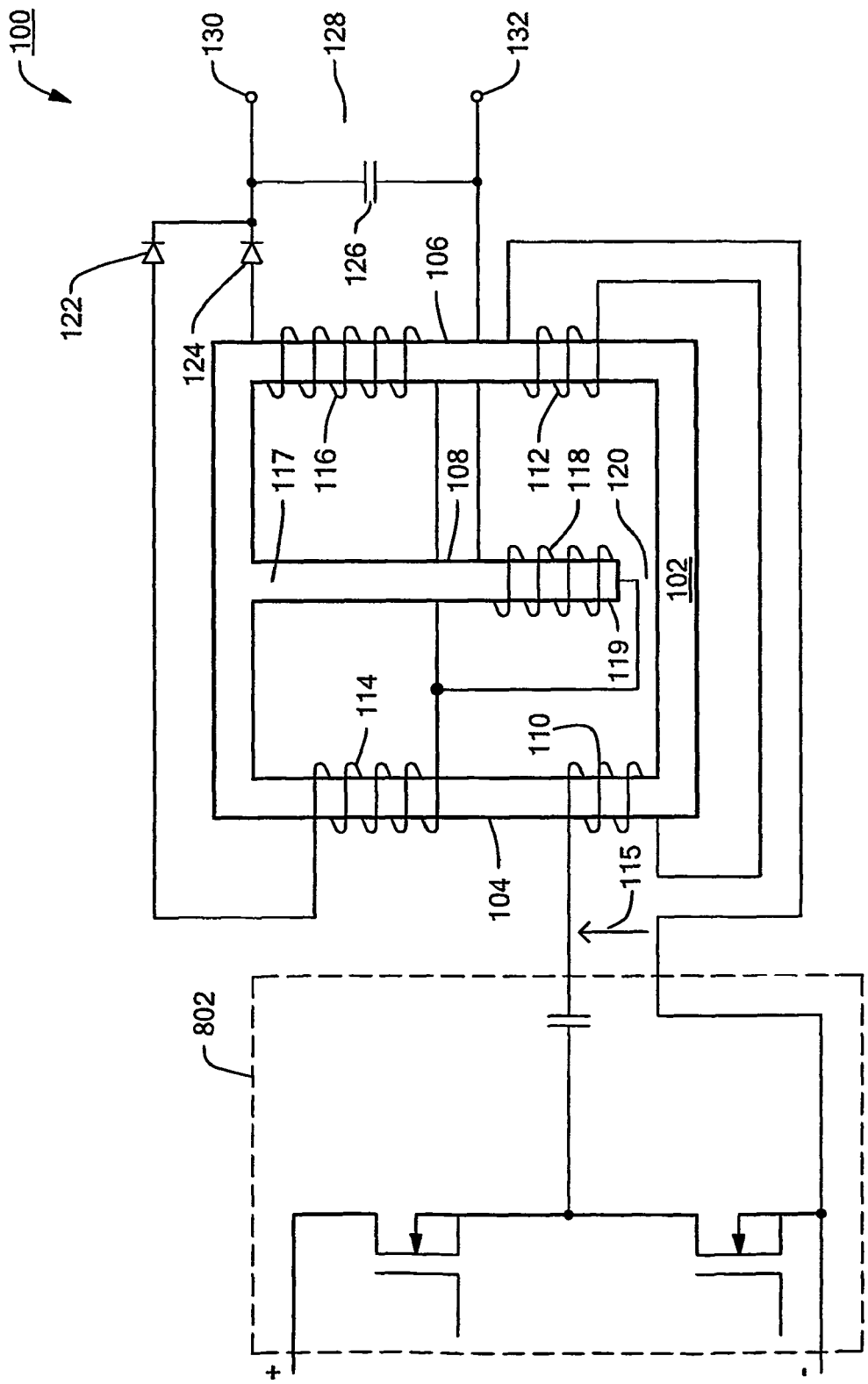
FIG. 8 depicts the integrated magnetic assembly used in conjunction with a second half bridge voltage inverter.

FIGS. 6–9 depict the integrated magnetic structure described above in various converter configurations. FIG. 6 depicts the integrated magnetic structure 100 in conjunction with a full bridge inverter 602. The full bridge inverter 602 includes switched rectifiers 604a–d which can be under the control of a feedback control system (not shown) that provide switched voltages having positive and negative polarities to the input 115 of the integrated magnetic structure 100. FIGS. 7 and 8 depict the integrated magnetic structure 100 in conjunction with first and second half bridge inverters, respectively.

Figure 9:
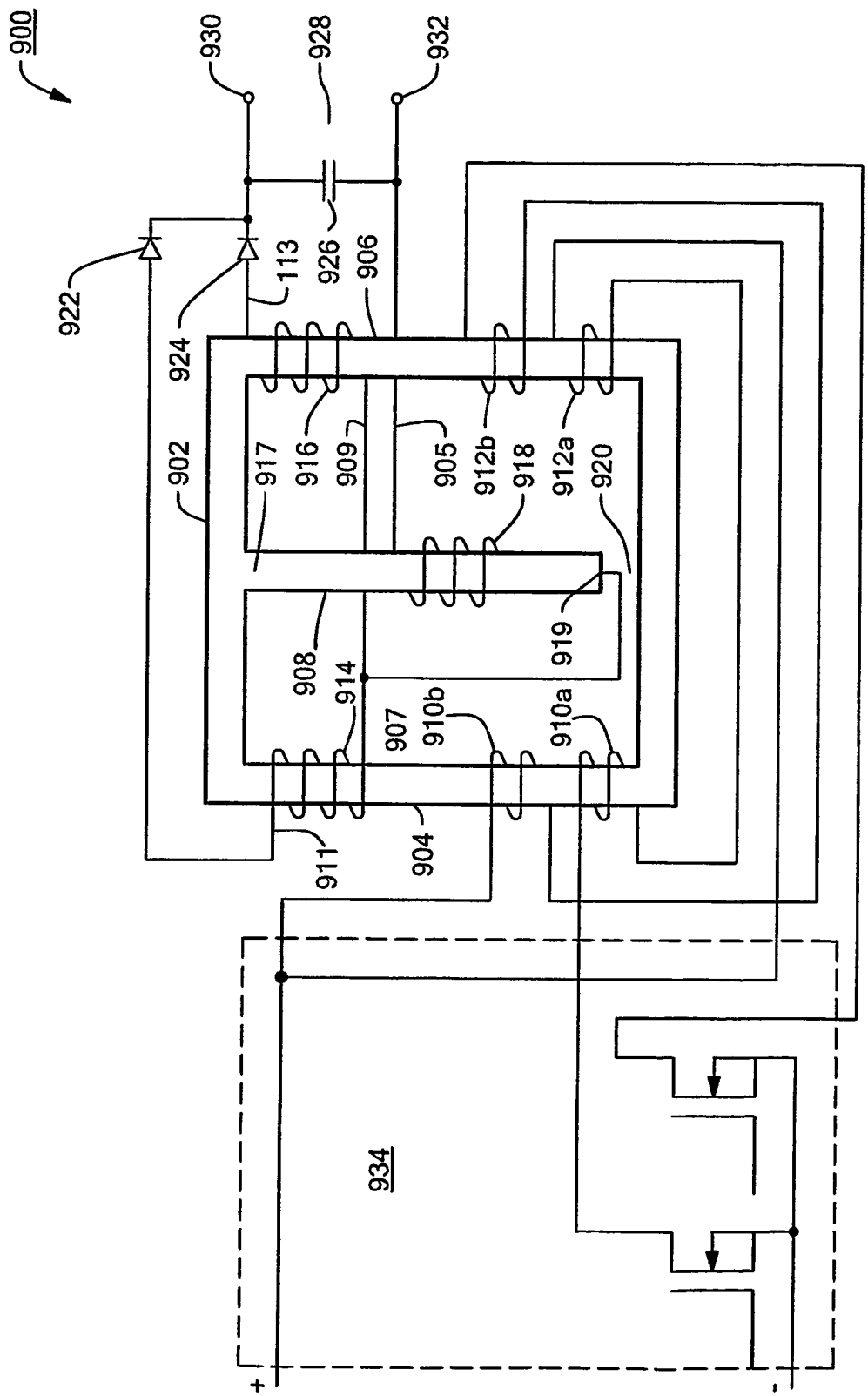
FIG. 9 depicts another embodiment of the integrated magnetic assembly used in conjunction with a push-pull voltage inverter.

FIG. 9 depicts another embodiment of the integrated magnetic structure in conjunction with a push-pull inverter 934. In particular, the integrated magnetic structure 900 includes a unitary magnetic assembly 902 that includes a first leg 904 and a second leg 906 that are physically joined and magnetically coupled. A third leg 908 is physically connected and magnetically coupled to the unitary magnetic structure 902 at a first end 917 and is coupled to the unitary magnetic structure 902 at a second end 919 via an air gap 920.

Since the integrated magnetic structure 900 is to be used in conjunction with a push-pull voltage inverter 934, in the illustrative embodiment depicted in FIG. 9, two pairs of primary windings are used. Each pair of the primary windings has first and second primary windings on the corresponding first and second legs. Accordingly, the first primary winding is comprised of a first primary winding 910a and a second primary winding 912a that are disposed on the first leg 904 and the second leg 906 respectively. Similarly, the second primary winding is comprised of a third primary winding 910b and a fourth primary winding 912b that are disposed on the first leg 904 and the second leg 906 respectively. The first and third primary windings 910a and 910b are wound in an opposite direction from the second and fourth primary winding 912a and 912b. The first and second primary windings 910a and 912a are electrically connected in series with one another as are the third and fourth primary windings 910b and 912b. The voltage from the push-pull voltage inverter 934 is provided across the first and second primary windings 910a and 912a and the third and fourth primary windings 910b and 912b.

A first secondary winding 914 is disposed on the first leg 904 and is magnetically coupled to the first and third primary windings 910a and 910b via the unitary magnetic assembly 902. A second secondary winding 916 is disposed on the second leg 906 and is magnetically coupled to the second and fourth primary windings 912a and 912b via the unitary magnetic assembly 902. As discussed above, the first and third primary windings and the second and fourth primary windings produce respective magnetic fluxes that have opposite polarities due to the opposite winding directions. As such, secondary windings 914 and 916 will produce output voltages having opposite polarities.

A first end 911 of the first secondary winding 914 is electrically connected to an input of a first rectifier 922, and a first end 913 of the second winding 916 is electrically connected to an input of a second rectifier 924. The outputs of the first and second rectifiers 922 and 924 are connected together to form a first output terminal 930.

A second end 907 of the first secondary winding 914 is electrically connected to a second end 909 of the second secondary winding 916. The inductor winding 918 includes a first end 903 that is electrically connected to the second ends 907 and 909 of the first and second secondary windings 914 and 916. The inductor winding 918 includes a second end 905 that is electrically connected to a second output terminal 932. A capacitor 926 is connected between the first and second output terminals 930 and 932 forming output 928. The capacitor 928 acts a filter capacitor and may be optional depending on the system requirements, or depending on the application, it may be replaced by other electronic components. As discussed above, the capacitor 928 is used to filter the output voltage and output current. As such the capacitor 928 may be replaced by other filter components, or in some circumstances depending on the application the capacitor 928 can be eliminated.

Figure 10:
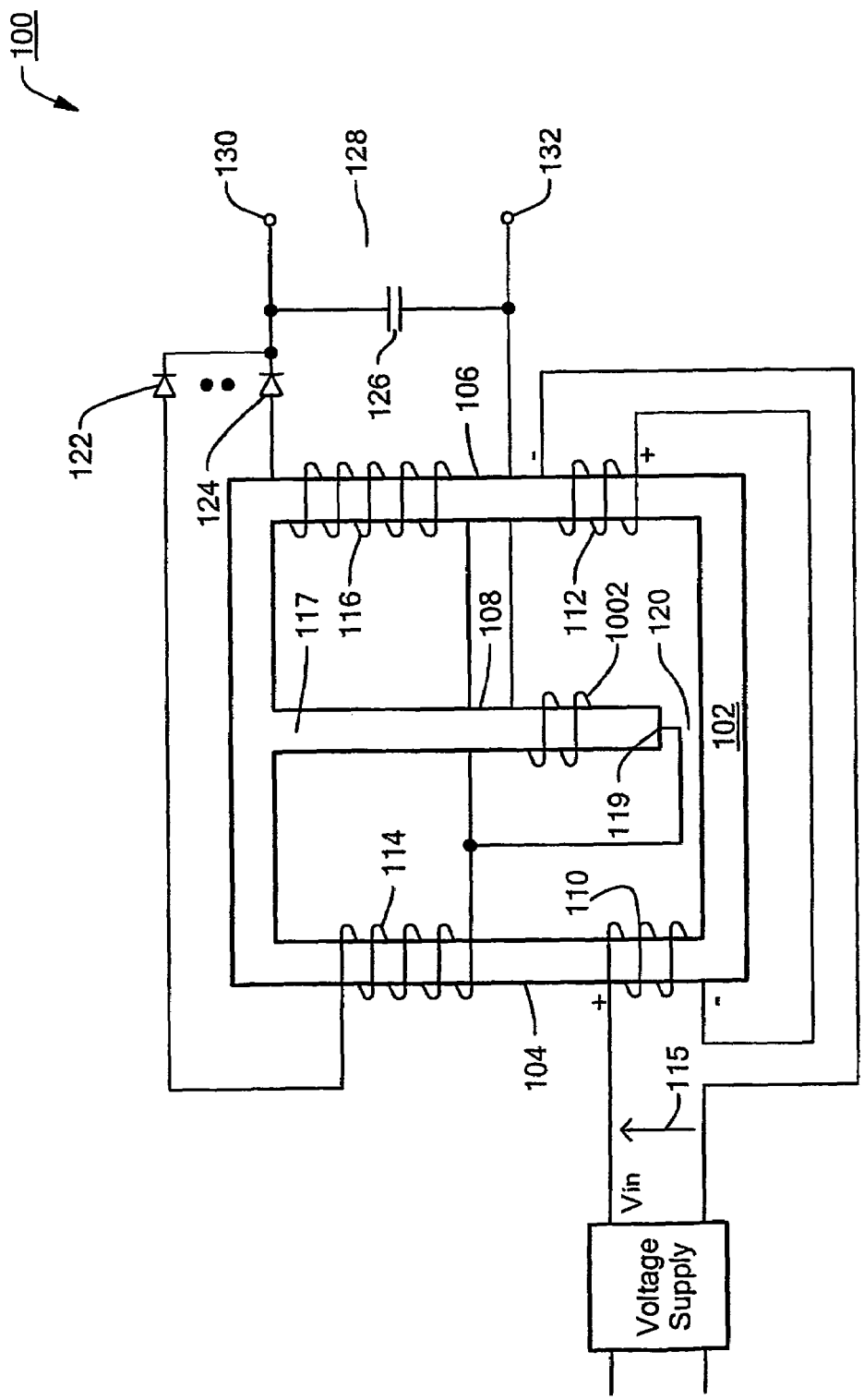
FIG. 10 depicts another embodiment of the integrated magnetic assembly.

FIG. 10 depicts another embodiment of the integrated magnetic structure in which the inductor winding 1002 is disposed in the opposite direction from the inductor winding 118 in FIG. 1. Otherwise, all components are identical to the components depicted in FIG. 1 and described therewith.

Figure 11:
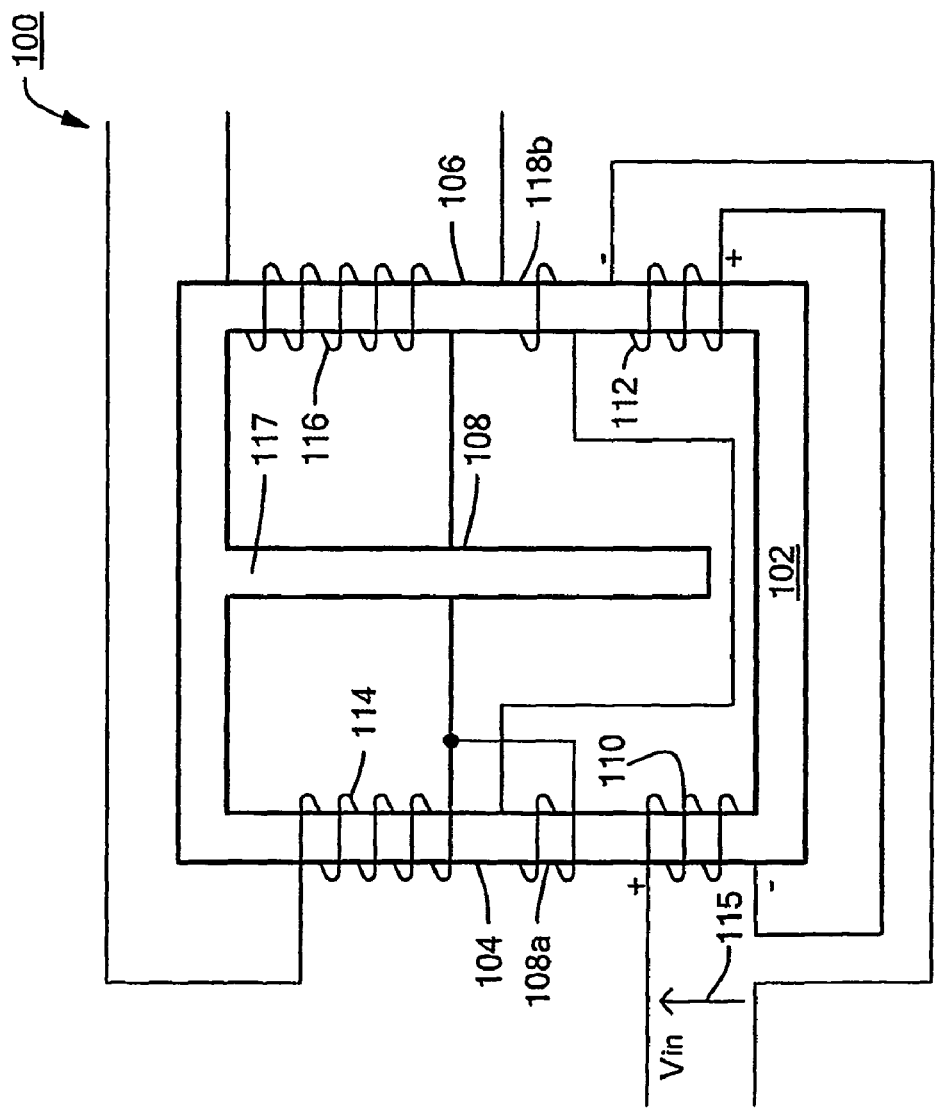
FIG. 11 depicts another embodiment of the integrated magnetic assembly.

FIG. 11 depicts an embodiment of the integrated magnetic assembly in which the primary and secondary transformer windings are split into two windings and the inductor windings are split into first and second inductor windings 118*a* and 118*b* and are formed on the first and second legs 104 and 106 of the unitary magnetic structure 102.

Figure 12:
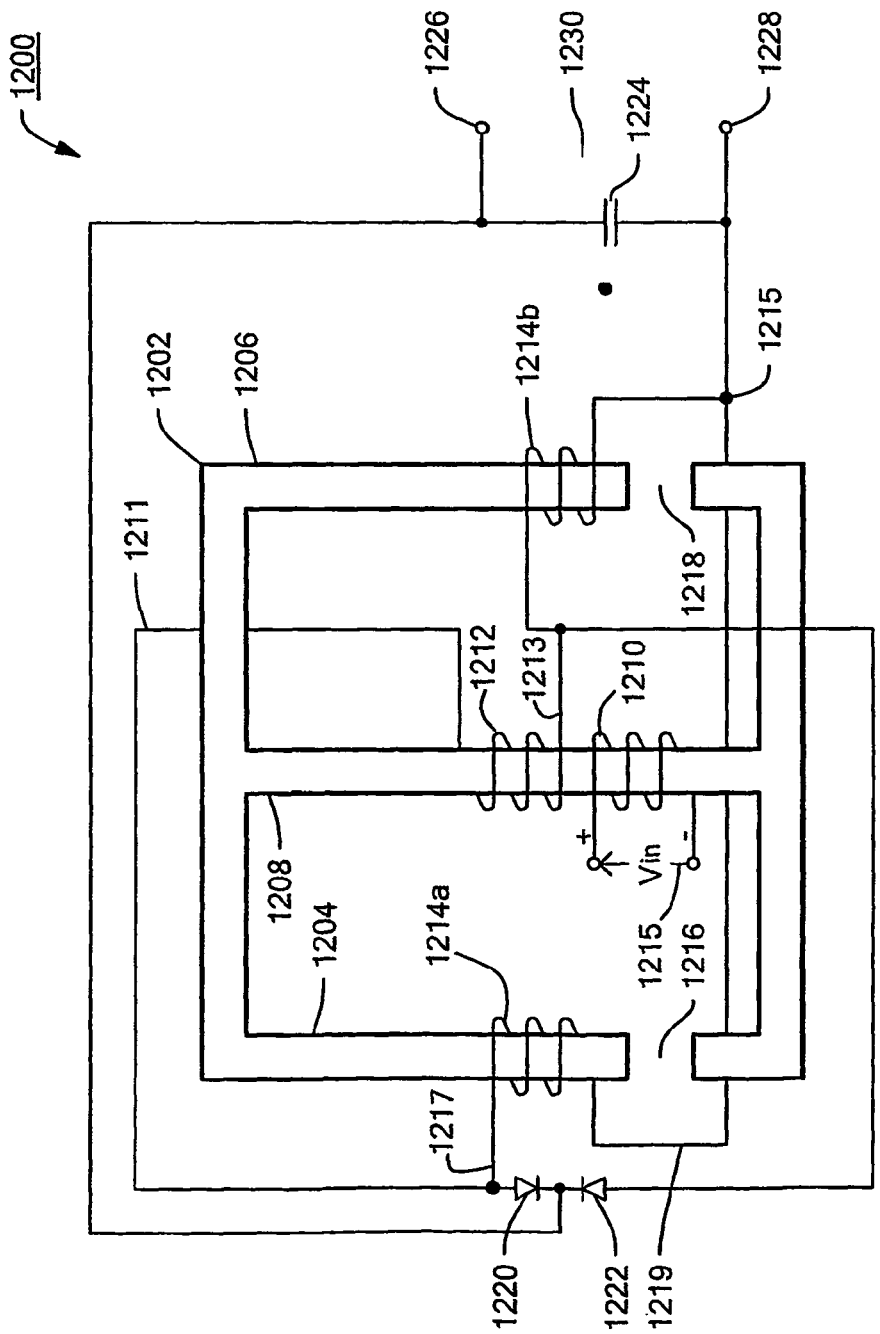
FIG. 12 depicts another embodiment of the integrated magnetic assembly

FIG. 12 depicts another embodiment of the integrated magnetic structure configured as a full wave converter in which the primary and secondary windings are disposed on the third leg and the inductor winding is split between the first and second legs. In particular, the integrated magnetic structure 1200 includes a unitary magnetic assembly 1202 that has first, second, and third legs, 1204, 1206, and 1208 respectively. An input voltage is applied to input 1215 and is coupled to primary winding 1210 disposed on the third leg 1208. A secondary winding 1212 is also disposed on the third leg 1208 and is magnetically coupled to the primary winding 1210 via the unitary magnetic structure 1202. An inductor winding includes a first inductor winding 1214*a* disposed on the first leg 1204 and a second inductor winding 1214*b* disposed on the second leg 1206.

When configured as a full wave converter, a first connection 1211 of the secondary winding 1212 is electrically connected to a first rectifier 1220 and a first connection 1217 of the first inductor winding 1214*a*. A second rectifier 1222 is coupled to the second connection 1213 of the secondary winding 1212 and the first connection of the second inductor winding 1214*b*. The outputs of the first and second rectifiers 1220 and 1222 are coupled together and form a first output terminal 1226. A second output terminal is formed with the second connection 1219 of the first inductor winding 1214*a* and the second connection 1215 of the second inductor winding 1214*b*. An output capacitor 1224 is electrically connected between the first and second output terminals 1226 and 1228. The output 1230 is taken across the capacitor 1224.

As discussed above, a winding that is disposed on the third leg 1208 can be split between the first and second legs 1204 and 1206. Accordingly, in the embodiment depicted in FIG. 12 can be modified by splitting the secondary winding 1212 into first and second secondary windings, and disposing the first secondary winding on the first leg and the second secondary winding on the second leg, wherein each of the two secondary windings would have the same polarity. Each of the first and second secondary windings would have first and second connections and the first connection of the first secondary winding on first leg 1204 is connected to the input of rectifier 1220, the second connection of the first secondary winding on first leg 1204 is connected to the first connection of the second secondary winding on second leg 1206, the second connection of the second secondary winding on second leg 1206 is connected to the input of rectifier 1222.

As discussed above, a winding that is disposed on the third leg 108 can be split between the first and second legs 104 and 106. Accordingly, in the embodiment depicted in FIG. 12 can be modified by splitting the primary winding 1210 into first and second primary windings, and disposing the first primary winding on the first leg and the second primary winding on the second leg, wherein each of the two primary windings would have the same polarity. Each of the first and second primary winding would have first and second connections and the first connection of the first primary winding on first leg 1204 is connected to one terminal of input Vin, the second connection of the first primary winding on first leg 1204 is connected to the first connection of the second primary winding on second leg 1206, the second connection of the second primary winding on second leg 1206 is connected to the other terminal of input Vin.

As discussed above, the capacitor 1224 is used to filter the output voltage and current and may be replaced by other filter components, or in some circumstances eliminated entirely.

It should be appreciated that other variations to and modifications of the above-described integrated magnetic apparatus may be made without departing from the inventive concepts described herein. For example, instead of a single output, a plurality of outputs may be provided for by providing a plurality of sets of secondary windings and inductor windings which are connected as described above, or a plurality of third legs, each having a separate inductor winding. Accordingly, the invention should not be viewed as limited except by the scope and spirit of the appended claims.

What is claimed is:

1. An integrated magnetic assembly comprising:
   a unitary magnetic structure including a first leg, a second leg and a third leg that are all magnetically coupled and physically connected together;
   a primary winding disposed on at least one leg of the unitary magnetic structure and magnetically coupled thereto;
   a secondary winding disposed on at least one leg of the unitary magnetic structure and wherein the primary and secondary windings are magnetically coupled to one another via the unitary magnetic structure, the secondary winding including first and second output connections; and
   an inductor winding disposed on at least one leg of the unitary magnetic structure, the inductor having a first connection electrically connected to the second connection of the secondary winding, the inductor having a second connection providing an inductor output.

2. The integrated magnetic assembly of claim 1 wherein the third leg is disposed between the first and second legs of the unitary magnetic structure.

3. The integrated magnetic assembly of claim 1 wherein:
   the primary winding includes a first primary winding disposed on the first leg and a second primary winding disposed on the second leg, the first and second primary windings being electrically connected in series;
   the secondary winding includes a first secondary winding disposed on the first leg and a second secondary winding disposed on the second leg, wherein the first secondary winding is magnetically coupled to the first primary winding via the unitary magnetic structure and the second secondary winding is magnetically coupled to the second primary winding via the unitary magnetic structure, the first and second secondary windings each having a first and second connections, wherein the second connection of the first secondary winding is electrically connected to the second connection of the second secondary winding; and the first connection of the inductor winding being electrically connected to the electrical connection between the second connections of the first and second secondary winding.

4. The integrated magnetic assembly of claim 3 wherein the first and second primary windings each have a corresponding orientation and the respective orientations have substantially opposite polarity with respect to one another.

5. The integrated magnetic assembly of claim 3 wherein the first and second secondary windings have a corresponding polarity and the respective polarities are substantially the same with respect to one another and wherein the inductor winding has a polarity that is substantially opposite to the polarity of the first and second secondary windings.

6. The integrated magnetic assembly of claim 3 wherein the first and second secondary windings have a corresponding polarity and the respective polarities are substantially the same with respect to one another and wherein the inductor windings has a polarity that has substantially the same polarity as the of the first and second secondary windings.

7. The integrated magnetic assembly of claim 3 wherein the inductor winding is disposed on the third leg of the unitary magnetic structure.

8. The integrated magnetic assembly of claim 3 wherein the inductor winding includes a first inductor winding disposed on the first leg and a second inductor winding disposed on the second leg, wherein each of the first and second inductor windings includes first and second connections and wherein the first connection of the first inductor winding is electrically connected to the second connection of the second inductor winding and wherein the second connection of the first inductor winding is electrically connected to the electrically interconnected second connections of the first and second secondary windings.

9. The integrated magnetic assembly of claim 3 wherein at least one leg of the unitary magnetic structure includes an energy storage component.

10. The integrated magnetic assembly of claim 9 wherein the energy storage component is an air gap.

11. The integrated magnetic structure of claim 9 wherein the first leg has a first cross-sectional area and the second leg has a second cross sectional area and the third leg has a third cross sectional area and wherein the energy storage component is a portion of the at least one leg that includes the energy storage component has a fourth cross sectional area that is smaller than the smallest of the first, second, and third cross sectional areas.

12. The integrated magnetic structure of claim 9 wherein the first legs is composed of a first material having a first permeance, the second legs is composed of a second material having a second permeance and the third leg is composed of a material having a third permeance, wherein the energy storage component is composed of a fourth material having a fourth permeance that is less than the smallest of the first, second, and third permeances.

13. The integrated magnetic assembly of claim 1 wherein: the primary winding is disposed on the third leg; and the secondary winding is disposed on the third leg, wherein the secondary winding is magnetically coupled to the primary winding via the unitary magnetic structure.

14. The integrated magnetic assembly of claim 13 wherein the inductor winding includes a first inductor winding disposed on the first leg and a second inductor winding disposed on the second leg, wherein each of the first and second inductor windings includes first and second connections and wherein the first connection of the first inductor winding is electrically connected to the first connection of the secondary winding and the second connection of the first inductor winding is electrically connected to the second connection of the second inductor winding, and the first connection of the second inductor winding is electrically connected to the second connection of the secondary winding.

15. The integrated magnetic assembly of claim 13 wherein at least one leg of the unitary magnetic structure includes an energy storage component.

16. The integrated magnetic assembly of claim 13 wherein the energy storage component is an air gap.

17. The integrated magnetic structure of claim 16 wherein the first leg has a first cross-sectional area and the second leg has a second cross sectional area and the third leg has a third cross sectional area and wherein the energy storage component is a portion of the at least one leg that includes the energy storage component has a fourth cross sectional area that is smaller than the smallest of the first, second, and third cross sectional areas.

18. The integrated magnetic structure of claim 16 wherein the first legs is composed of a first material having a first permeance, the second legs is composed of a second material having a second permeance and the third leg is composed of a material having a third permeance, wherein the energy storage component is composed of a fourth material having a fourth permeance that is less than the smallest of the first, second, and third permeances.

19. The integrated magnetic assembly of claim 1 wherein:
the primary winding includes a first primary winding disposed on the first leg and a second primary winding disposed on the second leg, the first and second primary windings being electrically connected in series;
the secondary winding disposed on the third leg, the secondary winding including first and second connections;
the inductor winding including a first inductor winding disposed on the first leg and a second inductor winding disposed on the second leg, wherein each of the first and second inductor windings includes first and second connections and wherein the first connection of the first inductor winding is electrically connected to the first connection of the secondary winding and wherein the second connection of the first inductor winding is electrically connected to the second connection of the second inductor winding and wherein the first connection of the second inductor winding is electrically connected to the second connection of the secondary winding.

20. The integrated magnetic assembly of claim 1 wherein:
the primary winding disposed on the third leg;
the secondary winding including a first secondary winding disposed on the first leg and a second secondary winding disposed on the second leg, wherein the first and second secondary windings are magnetically coupled to the primary winding via the unitary magnetic structure, the first and second secondary windings each having a first and second connections, wherein the second connection of the first secondary winding is electrically connected to the first connection of the second secondary winding; and the inductor winding includes a first inductor winding disposed on the first leg and a second inductor winding disposed on the second leg, wherein each of the first and second inductor windings includes first and second connections and wherein the first connection of the first inductor winding is electrically connected to the first connection of the first secondary winding and the second connection of the first inductor winding is electrically connected to the second connection of the second inductor winding and wherein the first connection of the second inductor winding is electrically connected to the second connection of the second secondary coil.

21. A DC—DC converter comprising:
an integrated magnetic assembly comprising:
   a unitary magnetic structure including a first leg, a second leg and a third leg that are all magnetically coupled and physically connected together;
   a primary winding including a first primary winding disposed on the first leg and a second primary winding disposed on the second leg, the first and second primary windings being electrically connected in series;
   a secondary winding including a first secondary winding disposed on the first leg and a second secondary winding disposed on the second leg, wherein the first secondary winding is magnetically coupled to the first primary winding via the unitary magnetic structure and the second secondary winding is magnetically coupled to the second primary winding via the unitary magnetic structure, the first and second secondary windings each having first and second connections, wherein the second connection of the first secondary winding is electrically connected to the second connection of the second secondary winding;
   an inductor winding disposed on at least one leg of the unitary magnetic structure, the inductor having a first connection electrically connected to the electrically connected second connections of the first and second secondary windings, the inductor having a second connection;
a first rectifier having an input and output, the input of the first rectifier being electrically connected to the first connection of the first secondary winding;
a second rectifier having an input and output, the input of the first rectifier being electrically connected to the first connection of the second secondary winding;
the outputs of the first and second rectifiers electrically connected together to form a first output terminal and the second connection of the inductor forming a second output terminal, where in a signal provided on the first output terminal and a signal provided on the second output terminal will have substantially opposite polarities; and
an input voltage source electrically connected across the primary winding.

22. The DC—DC converter of claim 21 wherein the first and second primary windings each have a corresponding polarity and the respective polarities are substantially opposite with respect to one another.

23. The DC—DC converter of claim 21 wherein the first and second secondary windings have a corresponding polarity and the respective polarities are substantially the same with respect to one another and wherein the inductor winding has an polarity that is substantially opposite in polarity to the of the first and second secondary windings.

24. The DC—DC converter of claim 21 wherein the first and second secondary windings have a corresponding polarity and the respective polarities are substantially the same with respect to one another and wherein the inductor windings has an polarity that has substantially the same polarity as the the first and second secondary windings.

25. The DC—DC converter of claim 21 wherein the inductor winding is disposed on the third leg of the unitary magnetic structure.

26. The DC—DC converter of claim 21 wherein the inductor winding includes a first inductor winding disposed on the first leg and a second inductor winding disposed on the second leg, wherein each of the first and second inductor windings includes first and second connections and wherein the first connection of the first inductor winding is electrically connected to the second connection of the second inductor winding and wherein the second connection of the first inductor winding is electrically connected to the electrically interconnected second connections of the first and second secondary windings.

27. The DC—DC converter of claim 21 wherein the third leg of the unitary magnetic structure includes an energy storage component.

28. The DC—DC converter of claim 27 wherein the energy storage component is an air gap.

29. The DC—DC converter of claim 21 wherein the input voltage source is a full bridge voltage inverter.

30. The DC—DC converter of claim 21 wherein the input voltage source is a half-bridge converter.

31. The DC—DC converter of claim 21 further including a capacitor electrically connected between the first output terminal and the second connection of the inductor winding, wherein the output is provided across the capacitor.

32. A DC—DC converter comprising:
an integrated magnetic assembly comprising:
   a unitary magnetic structure including a first leg, a second leg and a third leg that are all magnetically coupled and physically connected together;
   a primary winding including first and second primary windings disposed on the first and second legs respectively and third and fourth primary windings disposed on the first and second legs respectively, the first and second primary windings being electrically connected in series and the third and fourth primary windings being electrically connected in series;
   a secondary winding including a first secondary winding disposed on the first leg and a second secondary winding disposed on the second leg, wherein the first secondary winding is magnetically coupled to the first and third primary windings via the unitary magnetic structure and the second secondary winding is magnetically coupled to the second and fourth primary winding via the unitary magnetic structure, the first and second secondary windings each having first and second connections, wherein the second connection of the first secondary winding is electrically connected to the second connection of the second secondary winding;
   an inductor winding disposed on at least one leg of the unitary magnetic structure, the inductor having a first connection electrically connected to the electrically connected second connections of the first and second secondary windings, the inductor having a second connection;

a first rectifier having an input and output, the input of the first rectifier being electrically connected to the first connection of the first secondary winding;

a second rectifier having an input and output, the input of the first rectifier being electrically connected to the first connection of the second secondary winding;

the outputs of the first and second rectifiers electrically connected together to form a first output terminal and the second connection of the inductor forming a second output terminal, where in a signal provided on the first output terminal and a signal provided on the second output terminal will have substantially opposite polarities; and a push-pull voltage source having first, second, and third, connections, wherein the first and third connections are electrically connected across the first and second primary windings and the second and first connections are electrically connected across the third and fourth primary windings.

33. The DC—DC converter of claim 32 wherein the first and second primary windings each have a corresponding polarity and the respective polarities are substantially opposite with respect to one another and wherein the third and fourth primary windings each have a corresponding polarity and the respective polarities are substantially opposite with respect to one another.

34. The DC—DC converter of claim 32 wherein the first and second secondary windings have a corresponding polarity and the respective polarities are substantially the same with respect to one another and wherein the inductor winding has an polarity that is substantially opposite in to the polarity of the first and second secondary windings.

35. The DC—DC converter of claim 32 wherein the first and second secondary windings have a corresponding polarity and the respective polarities are substantially the same with respect to one another and wherein the inductor windings has an polarity that has substantially the same polarity as the the first and second secondary windings.

36. The DC—DC converter of claim 32 wherein the inductor winding is disposed on the third leg of the unitary magnetic structure.

37. The DC—DC converter of claim 32 wherein the inductor winding includes a first inductor winding disposed on the first leg and a second inductor winding disposed on the second leg, wherein each of the first and second inductor windings includes first and second connections and wherein the first connection of the first inductor winding is electrically connected to the second connection of the second inductor winding and wherein the second connection of the first inductor winding is electrically connected to the electrically interconnected second connections of the first and second secondary windings.

* * * * *

UNITED STATES PATENT AND TRADEMARK OFFICE
CERTIFICATE OF CORRECTION

PATENT NO. : 7,034,647 B2 Page 1 of 1
APPLICATION NO. : 10/492238
DATED : April 25, 2006
INVENTOR(S) : Liang Yan et al.

It is certified that error appears in the above-identified patent and that said Letters Patent is hereby corrected as shown below:

Column 7, line 61 "$1^g$" should read --$1_g$--.

Signed and Sealed this

Twentieth Day of November, 2007

JON W. DUDAS
*Director of the United States Patent and Trademark Office*